United States Patent [19]

Nishio et al.

[11] Patent Number: 4,935,199
[45] Date of Patent: Jun. 19, 1990

[54] PROCESS FOR PRODUCING HIGH DENSITY SINTERED BODY

[75] Inventors: Hiroaki Nishio; Keiji Watanabe; Michitaka Satoh, all of Tokyo, Japan

[73] Assignee: NKK Corporation, Tokyo, Japan

[21] Appl. No.: 380,066

[22] Filed: Jul. 14, 1989

[30] Foreign Application Priority Data

Jul. 14, 1988 [JP] Japan ................ 63-172675

[51] Int. Cl.$^5$ ................ B22F 1/00
[52] U.S. Cl. ................ 419/36; 419/9; 419/37; 419/49; 264/60; 264/65
[58] Field of Search ............ 419/9, 36, 37, 49; 264/60, 65

[56] References Cited

U.S. PATENT DOCUMENTS

| | | | |
|---|---|---|---|
| 4,117,056 | 9/1978 | Jones | 264/65 |
| 4,427,785 | 1/1984 | Prochazka et al. | 264/65 |
| 4,502,983 | 3/1985 | Omori et al. | 264/65 |
| 4,657,754 | 4/1987 | Bauer et al. | 264/125 |
| 4,684,387 | 8/1987 | Clasen et al. | 264/60 |
| 4,840,763 | 6/1989 | Freitag | 264/65 |

Primary Examiner—Stephen J. Lechert, Jr.
Attorney, Agent, or Firm—Sughrue, Mion, Zinn, Macpeak & Seas

[57] ABSTRACT

In a process for producing a sintered body using a gas-impermeable membrane formed by softening of a powder layer provided on the surface of a porous body, a metal polymer selected from polysilanes, polycarbosilanes, polysilazanes and hydrolyzates of metal alkoxides is added as a binder to the powder layer. According to the process of the invention, the gas-impermeable membrane is formed with high reliability, and high density sintered bodies can be obtained in a simple process.

3 Claims, 1 Drawing Sheet

PROCESS FOR PRODUCING HIGH DENSITY SINTERED BODY

BACKGROUND OF THE INVENTION

1. Field of the Invention

This invention relates to a process for producing a high density sintered body of metal or ceramic, and more particularly, relates to a process for changing a metal or ceramic porous body to a high density sintered body by hot isostatic pressing (HIP).

2. Description of the Prior Art

HIP process is used for producing a high density sintered body from a molded body obtained by molding metal or ceramic powder into a prescribed form or a pre-sintered body thereof by heating at a high temperature under a high pressure with argon gas or nitrogen gas. In the HIP process, a porous body such as the above molded body or pre-sintered body is placed in a pressure vessel, and pressured isotopically at 500 to 3000 atm by a high pressure gas with heating at 600 to 2500° C. to obtain a densified body. As mentioned above, since a high pressure gas is used as a pressuring medium, it is necessary to take steps so the gas does not enter into the porous body. There are the following methods to prevent gas entering into the porous body. The pre-sintered body itself is made gas-impermeable by increasing the density up to more than 93 %, preferably more than 95%, of the true density. In the cases of usual gas-permeable molded bodies having a density of 40 to 75% of the true density and pre-sintered bodies having a density of less than 93 % of the true density, the molded body or pre-sintered body is placed in a gas-impermeable capsule, which is sealed, and densified by heating and compressing it from the outside of the capsule. In the above method, the capsule is previously prepared, and as a result, this method is difficult to be applied to a porous body having a complex shape.

Also, a powder layer is formed on the surface of the porous body, and converted to an impermeable membrane by softening the powder layer by heating to form a gas tight capsule. This method can be used for a porous body having a complex shape because of less restriction on the shape of a porous body. The compressing conditions with gas are disclosed in Japanese Patent KOKAI No. 54-146205 in the case of converting a powder layer formed on the surface of a porous body to an impermeable membrane, and similar compressing conditions with gas are disclosed in Japanese Patent KOKAI No. 54-144412 as to a silicon nitride porous body.

The powder layer has also been investigated as to the material thereof, and the powder layer disclosed in Japanese Patent KOKAI No. 59-35870 is formed on the surface of a silicon nitride porous body to yield a double layer structure. The inner layer is composed of a high melting point glass, a high melting point glass-forming material or a high melting point metal material, and the outer layer is composed of a low melting point glass or a low melting point glass-forming material capable of conversion to an impermeable membrane at a temperature lower than the material of the inner layer.

The powder layer disclosed in Japanese Patent KOKAI No. 59-116178 is formed on the surface of a ceramic porous body composed of a high silica porous glass or a nitride glass thereof.

The powder layer disclosed in DE 3403917C1 has a double layer structure of which the inner layer does not contain a sintering aid and the outer layer contains a sintering aid. By the above structure, the outer layer is imparted with a function to be converted to an impermeable membrane, and the inner layer is imparted with a function as a separation layer being sintered little in order to facilitate the removal of them after HIP treatment.

As the method of forming the powder layer, in general, powder is suspended in a solvent to form a slurry, and the slurry is applied onto a porous body by brushing, immersing, spraying or the like. The thickness of the powder layer is controlled by repeating the application and drying, or the like. Various methods are disclosed in the aforementioned Japanese Patent KOKAI Nos. 54-146205, 54-144412, 59-35870 and 59-116178 and DE 3403917C1. For example, in the process of DE 3403917C1, a reaction-bonded silicon nitride porous body containing 0 to 4 wt. % of $Y_2O_3$ as a sintering aid and having a porosity of about 20 % is immersed in a slurry composed of 50 wt. % of $Si_3N_4$ and 50 wt. % of isopropyl alcohol, and a powder layer of silicon nitride about 1 mm thick is formed on the surface of the porous body by the capillary action thereof. The porous body is dried at 110° C. in a dryer to remove isopropyl alcohol, and a first layer is formed. Subsequently, the porous body is immersed in a slurry composed of 80 wt. % of $Si_3N_4$, 15 wt. % of $Y_2O_3$ and 5 wt. % of $Al_2O_3$, and a second layer is formed on the first layer by the capillary action of the porous body. The porous body is dried again at 110° C. in a dryer to remove isopropyl alcohol. Thus, the porous body obtained has a first layer of silicon nitride not containing a sintering aid and a second layer of silicon nitride containing sintering aid of $Y_2O_3$ and $Al_2O_3$. The porous body is heated at 1820° C. for 10 minutes in a nitrogen gas atmosphere to convert the surface powder layer to a gas-impermeable membrane. Subsequently, the porous body is treated with HIP at 1750° C. at a pressure of 2000 Bar in an argon gas atmosphere. The densified body thus obtained is subjected to sandblasting, and the gas-impermeable membrane on the surface is removed to obtain a high density sintered body.

On the other hand, it is also known that the gas-impermeable membrane can be formed from a starting material which is not powder. In the production of a high density sintered body disclosed in Japanese Patent KOKAI No. 62-053162, a liquid inorganic polysilazane $(—SiH_2NH—)_n$ is applied onto a metal or ceramic porous body to form a membrane, and the membrane is rendered high pressure gas-impermeable by the oxidation of the surface portion, the thermal decomposition of residual inorganic polysilazane and the softening of the oxidized surface layer, prior to sintering the porous body at a high temperature and a high pressure.

Incidentally, the impermeable membrane is compressed at an extremely high pressure of 500 to 3000 atm through the compressing medium gas during HIP treatment. The impermeable membrane is required to have a high reliability capable of keeping gas impermeability against such a high pressure. The conventional slurry coating method has a problem in reliability. That is, contraction of the powder layer occurs during drying, and cracks are liable to form. When the powder concentration of the slurry is raised in order to decrease the contraction, the adherence of the powder to the porous body is insufficient, resulting in layer separation and in unevenness of layer thickness. Though it is effective to add an organic binder in order to avoid the generation of contraction cracks, defects are liable to occur during the removal of the binder by thermal decomposition. Usual organic binders are polyethylene glycol, polyvinyl alcohol, polyvinyl butyral, methyl cellulose, polymethyl methacrylate, polybutylacrylate and the like, and they are decomposed by heating and evaporated. Therefore, when defects do not occur in the membrane through the removal process of the organic binder, the membrane is frequently separated in the temperature elevation process up to the softening temperature necessary for rendering the membrane impermeable.

While, the coating method of inorganic polysilazane disclosed in Japanese Patent KOKAI No. 62-053162 is excellent in the adherence to porous bodies, it has the following problems. Contraction of the membrane greatly occurs during thermal decomposition resulting in the generation of cracks in the membrane and in the separation of the membrane in small pieces together with a part of the porous body. Even if only the cracks generate without the occurrence of the above separation, it is usually difficult to remedy such by the softening treatment of the membrane. Besides, in the above process, the surface of an inorganic polysilazane is oxidized, and the oxidized portion is softened. However, since the softening temperature range is narrow, it is not easy to set the softening temperature for each porous body. Moreover, the softening point and viscosity of the membrane formed can be adjusted by mixing the liquid inorganic polysilazane with $Si_3N_4$ powder, $B_2O_3$ powder or $Al_2O_3$ powder. The formation of the impermeable membrane depends on $SiO_2$ produced by the oxidation of the inorganic polysilazane. However, the control of the oxidation degree is difficut, and the gas-impermeable membrane is often not formed.

SUMMARY OF THE INVENTION

An object of the invention is to provide a process for producing a high density sintered body capable of forming a gas-impermable membrane resistant to HIP treatment having high reliability.

Another object of the invention is to provide a process for easily producing a high density sintered body capable of forming a gas-impermeable membrane resistant to HIP treatment.

The present inventors have investigated in order to develop a process for producing a high density sintered body wherein the aforementioned problems have been solved, and achieved the above objects by incorporating a metal polymer as a binder into the powder layer capable of conversion to a gas-impermeable membrane.

Thus, the present invention provides a process for producing a ceramic or metal sintered body comprising a step of coating a powder capable of conversion to a gas-impermeable membrane through heating onto the surface of a porous body which is a molded body of a ceramic powder or a metal powder or a sintered body thereof, a step of forming the gas-impermeable membrane on the surface of the porous body by heating, a step of conducting a hot isostatic pressing against the porous body on the surface of which the gas-impermeable membrane is formed, and a step of removing the gas-impermeable membrane after the hot isostatic pressing, wherein 0.5 to 65 parts by weight of a metal polymer selected from the group consisting of polysilanes, polycarbosilanes, polysilazanes and hydrolyzates of metal alkoxides is added as a binder to per 100 parts by weight of the powder capable of converting to a gas-impermeable membrane, and the mixture is coated onto the surface of the porous body.

DETAILED DESCRIPTION OF THE INVENTION

Figure 1:
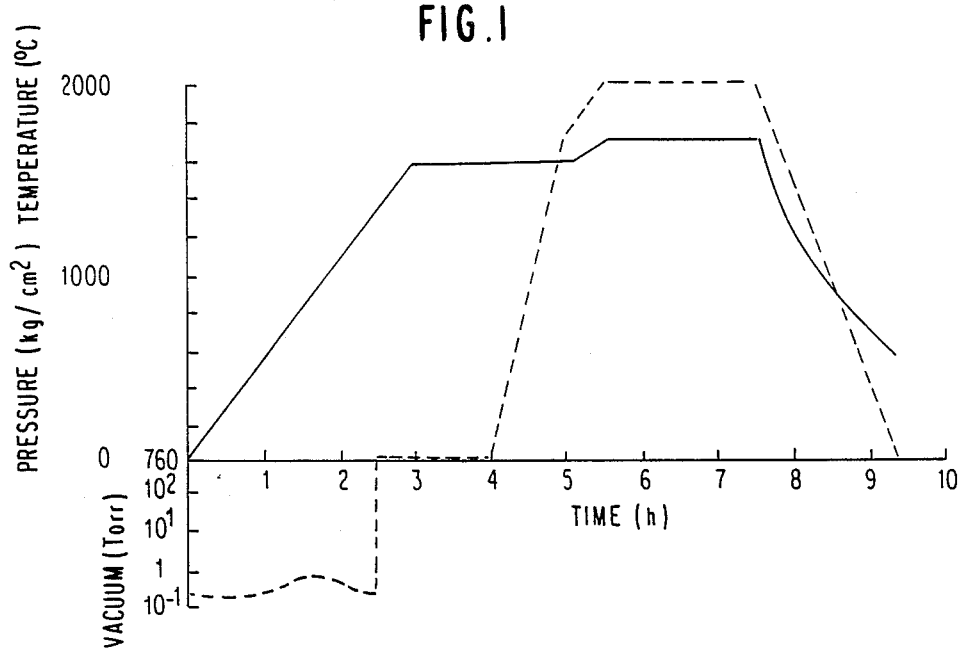
FIGS. 1 and 2 show the HIP conditions employed in the Examples. The full line indicates the temperature, and the broken line indicates the pressure and the degree of the vacuum.

The porous body of ceramic or metal may be composed of a material capable of densifying upon HIP treatment, and the forming method of the porous body is not restricted. Such a ceramic material includes nitrides such as silicon nitride, aluminum nitride and boron nitride, carbides such as silicon carbide, chromium carbide and boron carbide, borides such as titanium diboride and zirconium diboride, oxides such as alumina, zirconia and mullite, carbonitrides, oxynitrides, compound oxides and the like. The metal material includes iron base alloys such as stainless steel, high speed steel and die steel, nickel base alloys such as IN-100, cobalt base alloys such as stellite, intermetallic compounds such as $Ni_3Al$ and TiAl, cermets such as WC-Co and TiCN-Ni, and the like.

As the method of forming the porous body, the powder of the above material is molded by a known molding method such as uniaxial pressing, CIP, slip casting or injection molding, and the molded body is optionally dewaxed and/or pre-sintered. As reaction-bonded silicon nitride, the porous body may be formed by converting the metal silicon of a metal silicon powder molded body to silicon nitride through heating up to about 1350° C. in an atmosphere containing nitrogen gas. The process of the invention is not effective for a pre-sintered body having only closed pores which are not opened to the outside, because such a pre-sintered body can be subjected to HIP treatment directly. When the pre-sintered body has open pores in addition to closed pores, it is empirically known that the ratio (theoretical density ratio) of the density of the pre-sintered body to the true density is not more than 95%. The process of the invention is effective for the above pre-sintered body. The density of the molded body is usually 40 to 75% of the true density. When the raw powder is ultra-fine powders having a particle size of less than 0.1 μm, the density is extremely low, such as about 35%. The process of the invention is applicable to a porous body having such a low density. That is, the present invention is applicable to porous bodies having a theoretical density ratio of 35 to 95%.

The powder capable of conversion to a gas-impermeable membrane is metal or ceramic powder which is aggregates of particles which are softened to close the pores of the porous body and convert it to a membrane which substantially does not pass gases by itself, by heating. Such a powder includes the powders of various glasses such as quartz glass, high silica glass, borosilicate glass, aluminosilicate glass and soda quartz glass. Quartz glass is softened at 1550 to 1650° C., high silica glass is softened at about 1500° C., borosilicate glass is softened at 800 to 850° C., and aluminosilicate glass is softened at 900 to 950° C. The softening point of the glass powders may be raised by adding ceramic or metal powder having a high thermal resistance, such as yttria, alumina or silica. In this case, the powder is converted to a highly viscous melt containing crystalline particles, when it is heated.

The metal polymer acts as a binder for fixing the powder capable of conversion to a gas-impermeable membrane on the surface of the porous body in a layer form, and therefore, it is restricted to those having a solvent. By the above property, it is possible to prepare a slurry composed of a solution of a metal polymer dissolved in the solvent and the powder capable of conversion to a gas-impermeable membrane suspended therein, to coat the surface of the porous body therewith, and then, to remove the solvent by drying or the like. The metal polymer leaves ceramic or metal through the thermal decomposition. The residue acts as a binder from the initiation of the thermal decomposition to the softening of the powder capable of conversion to a gas-impermeable membrane, and prevents the generation of cracks and separation. Thus, the powder capable of conversion to a gas-impermeable membrane is converted to a dense membrane. The residue also prevents creeping of the softened membrane after the formation of the impermeable membrane. In the present invention, polysilanes, polycarbosilanes, polysilazanes and hydrolyzates of metal alkoxides are selected as the compound having such actions.

Polysilanes are those having a general formula

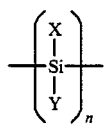

wherein the combination of X and Y includes phenyl (Ph) and methyl (Me), phenethyl and methyl, n-propyl and methyl, n-butyl and methyl, n-hexyl and methyl, and n-$C_{12}H_{23}$ and methyl, and those having a general formula

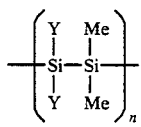

wherein the combination of X and Y includes n-hexyl and methyl, cyclohexyl and methyl, phenyl and phenyl, and phenyl and methyl. The above polysilanes are soluble in tetrahydrofuran (THF) and toluene.

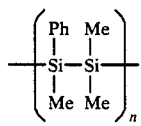

is called polysilastyrene. Polycarbosilanes having the general formula

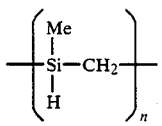

and are soluble in n-hexane.

Polysilazanes are inorganic polysilazanes (—$H_2$SiN-H—)$_n$ which are soluble in benzene, THF, pyridine, ether and methylene chloride and organic polysilazanes (—MeSiHNH—)$_n$ which are soluble in THF and ether. Hydrolyzates of metal alkoxides are also effective for the process of the invention. For example, when water is added to an Si(O$C_2H_5$)$_4$ ethanol solution, hydrolysis and condensation polymerization occur to produce polymers having —O$C_2H_5$ or —OH. The polymers are very effective as a binder of the powder capable of conversion to a gas-impermeable membrane. The solution obtained by the hydrolysis of Al(O$C_3H_7$)$_3$ in n-hexane is also usable as the binder.

The blending amount of the metal polymer is 0.5 to 65 parts by weight per 100 parts by weight of the powder capable of conversion to a gas-impermeable membrane. When the amount is less than 0.5 part by weight, the blending effect is insufficient, while, when the amount is beyond 65 parts by weight, high cracking which is difficult to overcome by the softening is generated by the influence of the contraction accompanied by the thermal decomposition of the metal polymer in the temperature elevation process to the softening point of the powder capable of conversion to a gas-impermeable membrane.

A suitable concentration of the metal polymer solution is about 1 to 50wt. %. The metal polymer may be mixed with the powder capable of conversion to a gas-impermeable membrane. Alternatively, the metal polymer may be mixed with the powder, and then dissolved by adding the solvent.

The mixture of the powder capable of conversion to a gas-impermeable membrane and the metal polymer solution may be applied to the ceramic or metal porous body by the aforementioned known method such as brushing, dipping, spraying or the like, and the thickness may be controlled according to a known method. After the coating, the porous body is usually dried by air drying or the like.

Subsequently, the porous body coated with the mixture of the powder capable of conversion to a gas-impermeable membrane and the metal polymer is heated to decompose the metal polymer to produce ceramic or metal, and further heated to form a gas-impermeable membrane on the surface of the porous body by the softening of the powder capable of conversion to a gas-impermeable membrane. As to the thermal decomposition product of the metal polymer, in the cases of polysilanes and polycarbosilanes, silicon carbide alone or containing a small amount of carbon remains. In the case of inorganic polysilazanes, the residue is different according to the atmosphere. Silicon nitride remains in a nitrogen atmosphere, while, a complex of silicon nitride and metal silicon remains in an inert gas atmosphere such as argon or in a reducing atmosphere containing hydrogen gas or carbon monoxide gas. A similar complex is produced under vacuum, and the ratio of metal silicon increases according to the elevation of the degree of vacuum. In the case of organic polysilazanes, a complex of silicon nitride and silicon carbide is produced. In the case of the hydrolyzate of metal alkoxides, oxide(s) of the metal employed are produced. For example, $SiO_2$ is produced from Si(O$C_2H_5$)$_4$, and $Al_2O_3$ is produced from Al(O$C_3H_7$)$_3$.

The above heating is preferably carried out in an inert gas atmosphere such as argon gas or nitrogen gas or under vacuum. The inert gas atmosphere may be made a reducing atmosphere by adding a small amount of hydrogen gas, carbon monoxide gas or the like. The hydrolyzates of metal alkoxides may be heated in the air, and some other metal polymers may also be heated in the air. In general, the heating is conducted in an inert gas atmosphere or under vacuum, and, for example, in a HIP apparatus. To conduct the heating under a high pressure is not preferred, and a suitable pressure is 0 to 10 kg/cm$^2$. The heating temperature and time is set so as to decompose the metal polymer to produce metal or ceramic. Suitable conditions are different according to the kind of the metal polymer and the like, and in the case of polysilazane, the heating may be carried out at 700 to 1000° C. for 30 to 120 minutes.

After forming the gas-impermeable membrane on the porous body, the porous body is subjected to HIP treatment according to a known method, and then the gas-impermeable membrane is removed. The removal of the membrane may be carried out according to a known method to remove a membrane, such as sandblasting, impact adding, brushing, scraping or the like.

EXAMPLES

Example 1

92 wt. % of Si$_3$N$_4$ powder was mixed with 8 wt. % of Al$_2$O$_3$ powder in methanol by using a ball mill for 24 hours, and then dried. The mixture was passed through a 100 mesh sieve to remove coarse grains, and filled in a metal mold. The mixture was pressed by a uniaxial press at a pressure of 300 kg/cm$^2$ to obtain a molded body having a size of 60 mm x 10 mm x 12 mm. The molded body was wrapped with a thin rubber bag, and rubber pressing was conducted at a pressure of 3 t/cm$^2$. Thus, 10 pieces of the porous body were prepared, and the bulk density of the porous bodies is 58% of the theoretical density.

Subsequently, 10 parts by weight of polysilastyrene was dissolved in n-hexane, and diluted 20 times by weight. 90 parts by weight of high silica glass (SiO$_2$-1.0 wt. % B$_2$O$_3$-0.5 wt. % Al$_2$O$_3$) powder was added to the solution to form a slurry. The slurry was applied to the whole surface of the above porous body by a brush, and dried. The above application and drying were repeated to form a powder layer having a thickness of 2.0 to 2.2 mm.

Ten pieces of the porous body so produced were placed in a HIP apparatus, and HIP treatment was conducted according to the conditions shown in FIG. 1. In the drawing, the full line indicates the temperature, and the broken line indicates the pressure and the degree of the vacuum. First, the porous bodies were heated up to 1300° C. under vacuum, and 1 kg/cm$^2$ (gauge pressure, hereafter, pressure values indicated are all gauge pressure) of nitrogen gas was introduced into the HIP apparatus. Then, the porous bodies were heated up to 1600° C., and the temperature was kept for 1 hour. In the above steps, the thermal decomposition of polysilastyrene, the production of SiC and the conversion of the powder layer to the impermeable membrane by the softening of the high silica glass were completed. Argon gas was introduced up to 1700 kg/cm$^2$, while the temperature was kept at 1600° C. The temperature and the pressure were simultaneously elevated to reach 2000 kg/cm$^2$ and 1700° C., and kept for 2 hours. Thereafter, the pressure was reduced, and the sintered bodies were naturally cooled. Thus, HIP treatment was completed.

The surface membrane of the sintered bodies was removed by sandblasting.

The sintered bodies thus obtained were all densified, and their density was 99.3% of the theoretical density on the average.

Example 2

5 parts by weight of polycarbosilane was dissolved in THF, and diluted 25 times by weight. 95 parts by weight of the same high silica glass powder as Example 1 was added to the solution to form a slurry. The slurry was applied to the whole surface of 10 pieces of porous bodies prepared in the same manner as Example 1 by a brush, and dried. The above application and drying were repeated to form a powder layer having a thickness of 2.1 to 2.2 mm. The porous bodies so produced were treated with HIP under the same conditions as Example 1, and the sintered bodies having a density of 99.5% of the theoretical density on the average were obtained.

Example 3

Ten pieces of the sintered body were produced in the same manner as Example 2, except that inorganic polysilazane was used as the metal polymer and benzene was used as the solvent. As a result, the sintered bodies had a density of 99.1% of the theoretical density on the average.

Example 4

A powder layer composed of 80 parts by weight of the same high silica glass as in Example 1 and 20 parts by weight of silicon ethoxide hydrolyzate was formed on the surface of 10 pieces of porous bodies of silicon nitride, and treated with HIP under the same conditions as Example 1 to obtain sintered bodies having a density of 99.2% of the theoretical density on the average.

Example 5

5 parts by weight of inorganic polysilazane was dissolved in benzene, and diluted 20 times by weight. 95 parts by weight of boron nitride powder was added to the solution to obtain A-solution.

5 parts by weight of inorganic polysilazane was dissolved in benzene, and diluted 20 times by weight. 95 parts by weight of the same high silica glass powder as in Example 1 was added to the solution to obtain B-solution.

A-solution was applied to the whole surface of 10 pieces of the porous bodies prepared in the same manner as in Example 1 by a brush, and dried. The above application and drying were repeated to form a powder layer having a thickness of about 1 mm. The application of B-solution thereon and drying were repeated to obtain a double powder layer having a thickness of 3.1 to 3.5 mm.

The porous bodies so produced were treated with HIP under the same conditions as Example 1. The membrane of the respective sintered bodies was easily separated by adding a light impact without sandblasting. The density of the sintered bodies was 99.6% of the theoretical density on the average.

Example 6

The concentration of inorganic polysilazane was raised to 35 wt. %, and 10 pieces of silicon nitride sintered bodies were obtained in the same manner as Example 3. As a result, the sintered bodies had a density of 99.2% of the theoretical density on the average.

Example 7

A high speed steel powder having a composition corresponding to M3/2 at AISI standard was prepared by water atomizing, and annealed at 900° C. for 3 hours under vacuum. The powder was filled in a rubber mold, and treated with CIP to obtain 10 pieces of a column-shaped porous body having a diameter of 30 mm and a length of 50 mm. The bulk density of the porous bodies was 71% of the theoretical density.

Subsequently, 20 parts by weight of inorganic polysilazane was dissolved in benzene, and diluted 20 times by weight. 80 parts by weight of borosilicate glass ($SiO_2$-13 wt. % $B_2O_3$-2 wt. % $Al_2O_3$-4 wt. % $Na_2O$) powder was added to the solution to form a slurry. The slurry was applied to the whole surface of the above porous body by a brush, and dried. The above application and drying were repeated to form a powder layer having a thickness of 3.5 to 3.8 mm.

Figure 2:
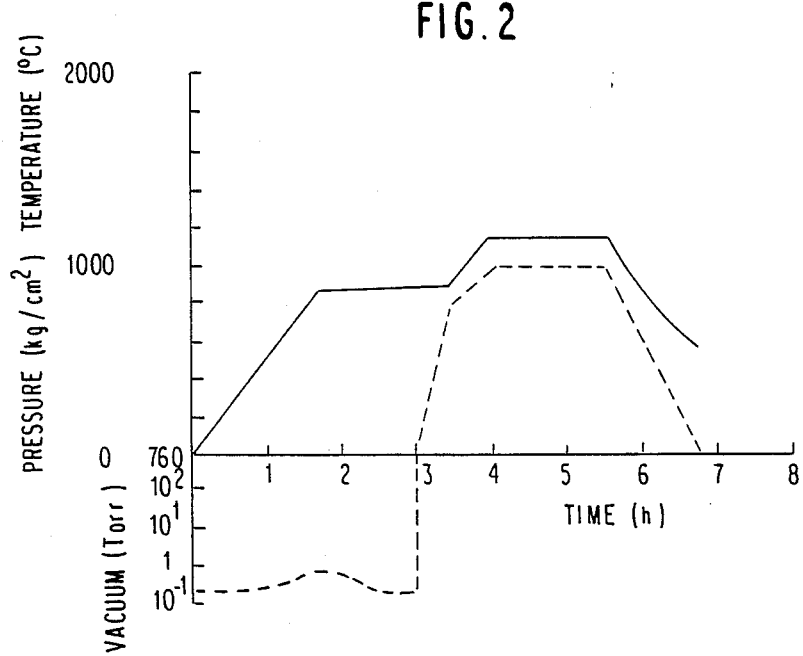

Ten pieces of the porous body so produced were placed in a HIP apparatus, and HIP treatment was conducted according to the conditions shown in FIG. 2. In the drawing, the full line indicates the temperature, and the broken line indicates the pressure and the degree of the vacuum. First, the porous bodies were heated up to 900° C. under vacuum, and kept for 1 hour. After confirming the degree of vacuum of 0.2 Torr, argon gas was introduced into the HIP apparatus up to 800 kg/cm$^2$. Then, the temperature and the pressure were simultaneously 2 and 1150° C., and kept for 1.5 elevated to reach 1000 kg/cm$^2$ and 1150° C., and kept for 1.5 hours. Thereafter, the pressure was reduced, and the sintered bodies were naturally cooled. Thus, HIP treatment was completed. The surface membrane of the sintered bodies were removed by sandblasting.

The sintered bodies thus obtained were all densified, and the density was 99.8% of the theoretical density on the average.

Comparative Example 1

Ten pieces of silicon nitride sintered body were prepared in the same manner as Example 1 without using the metal polymer, and the density of them was 82.0% the theoretical density on the average.

Comparative Example 2

When the amount of the inorganic polysilazane was increased to 50 parts by weight and the amount of the high silicate glass was decreased to 50 parts by weight in Example 3, cracks were observed on the membrane of the sintered bodies after the HIP treatment, and the density was 81.2% of the theoretical density on the average.

The above results are summarized in Table 1.

TABLE 1

| | Example | | | | |
|---|---|---|---|---|---|
| | 1 | 2 | 3 | 4 | 5 |
| Porous Body | Silicon Nitride | Silicon Nitride | Silicon Nitride | Silicon Nitride | Silicon Nitride |
| Composition | $Si_3N_4$ —8 wt % $Al_2O_3$ | $Si_3N_4$ —8 wt % $Al_2O_3$ | $Si_3N_4$ —8 wt % $Al_2O_3$ | $Si_3N_4$ —8 wt % $Al_2O_3$ | $Si_3N_4$ —8 wt % $Al_2O_3$ |
| Theoretical Density (%) | 58 | 58 | 58 | 58 | 58 |
| Gas-Impermeable Membrane-Forming Powder | High Silicate Glass | High Silicate Glass | High Silicate Glass | High Silicate Glass | Inside: BN Outside: High Silicate Glass |
| Composition | $SiO_2$ —1.0 wt % $B_2O_3$ —0.5 wt % $Al_2O_3$ | $SiO_2$ —1.0 wt % $B_2O_3$ —0.5 wt % $Al_2O_3$ | $SiO_2$ —1.0 wt % $B_2O_3$ —0.5 wt % $Al_2O_3$ | $SiO_2$ —1.0 wt % $B_2O_3$ —0.5 wt % $Al_2O_3$ | $SiO_2$ —1.0 wt % $B_2O_3$ —0.5 wt % $Al_2O_3$ |
| Content (wt %) | 90 | 95 | 95 | 80 | 95 |
| Metal Polymer | Polysilastyrene | Polycarbosilane | Inorganic Polysilazane | Hydrolyzate of Silicon Ethoxide | Inorganic Polysilazane |
| Content (wt %) | 10 | 5 | 5 | 20 | 5 |
| Solvent | n-Hexane | THF | Benzene | Ethanol | Benzen |
| HIP Conditions | FIG. 1 | FIG. 1 | FIG. 1 | FIG. 1 | FIG. 1 |
| Membrane Thickness | 2.0–2.2 | 2.1–2.4 | 2.0–2.2 | 2.1–2.3 | 3.1–3.5 |
| Theorectical Density Ratio of Suntered Body (%) | 99.3 | 99.5 | 99.1 | 99.2 | 99.6 |

| | Example | | Comparative | |
|---|---|---|---|---|
| | 6 | 7 | 1 | 2 |
| Porous Body | Silicon Nitride | High Speed Steel | Silicon Nitride | Silicon Nitride |
| Composition | $Si_3N_4$ —8 wt % $Al_2O_3$ | M3/2 | $Si_3N_4$ —8 wt % $Al_2O_3$ | $Si_3N_4$ —8 wt % $Al_2O_3$ |
| Theorectical Density (%) | 58 | 73 | 58 | 58 |
| Gas-Impermeable Membrane-Forming Powder | High Silicate Glass | Borosilicate Glass | High Silicate Glass | High Silicate Glass |
| Composition | $SiO_2$ —1.0 wt % $B_2O_3$ —0.5 wt % $Al_2O_3$ | $SiO_2$ —13 wt % $B_2O_3$ —2 wt % $Al_2O_3$ —4 wt % $Na_2O$ | $SiO_2$ —1.0 wt % $B_2O_3$ —0.5 wt % $Al_2O_3$ | $SiO_2$ —1.0 wt % $B_2O_3$ —0.5 wt % $Al_2O_3$ |
| Content (wt %) | 65 | 80 | 100 | 50 |
| Metal Polymer | Inorganic Polysilazane | Inorganic Polysilazane | | Inorganic Polysilazane |

TABLE 1-continued

| Content (wt %) | 35 | 20 | 0 | 50 |
|---|---|---|---|---|
| Solvent | Benzene | Benzen | n-Hexane | Benzene |
| HIP Conditions | FIG. 1 | FIG. 2 | FIG. 1 | FIG. 1 |
| Membrane Thickness | 2.9–3.2 | 3.5–3.8 | 2.1–2.3 | 2.2–2.4 |
| Theoretical Density Ratio of Suntered Body (%) | 99.2 | 99.8 | 82.0 | 81.2 |

We claim:

1. In a process for producing a ceramic or metal sintered body comprising a step of coating a powder capable of conversion to a gas-impermeable membrane through heating onto the surface of a porous body being a molded body of a ceramic powder or a metal powder or a sintered body thereof, a step of forming the gas-impermeable membrane on the surface of the porous body by heating, a step of conducting a hot isostatic pressing against the porous body on the surface of which the gas-impermeable membrane is formed, and a step of removing the gas-impermeable membrane after the hot isostatic pressing, the improvement which comprises adding 0.5 to 65 parts by weight of a metal polymer selected from the group consisting of polysilanes, polycarbosilanes, polysilazanes and hydrolyzates of metal alkoxides as a binder per 100 parts by weight of the powder capable of conversion to a gas-impermeable membrane, and coating the mixture onto the surface of the porous body.

2. The process of claim 1 wherein said ceramic or metal sintered body is composed of a member selected from the group consisting of nitrides, carbides, borides, oxides, carbonitrides, oxynitrides, iron based alloys, nickel based alloys, cobalt based alloys, intermetallic compounds and cermets.

3. The process of claim 1 wherein said powder is a member selected from the group consisting of quartz glass, high silica glass, borosilicate glass, aluminosilicate glass and soda quartz glass.

* * * * *